United States Patent [19]

Luciano et al.

[11] Patent Number: 4,574,435
[45] Date of Patent: Mar. 11, 1986

[54] SEAM CONSTRUCTION FOR PAPERMACHINE CLOTHING

[75] Inventors: William A. Luciano, Clifton Park; Mary Cosciani, Glenmont, both of N.Y.

[73] Assignee: Albany International Corp., Albany, N.Y.

[21] Appl. No.: 710,841

[22] Filed: Mar. 12, 1985

[51] Int. Cl.⁴ .................... D03D 25/00; F16G 3/02
[52] U.S. Cl. .................... 24/33 C; 24/31 R; 24/31 H; 24/33 M; 139/383 A
[58] Field of Search ............. 24/33 C, 31 R, 31 H, 24/31 W, 33 P, 33 V, 33 M; 139/383 AA; 156/161; 162/DIG. 1

[56] References Cited

U.S. PATENT DOCUMENTS

| | | | |
|---|---|---|---|
| 2,228,926 | 1/1941 | Matthaei et al. | 24/33 C |
| 2,883,734 | 4/1959 | Draper, Jr. | 24/33 C |
| 3,316,599 | 5/1967 | Wagner | 24/33 C |
| 3,581,348 | 6/1971 | Lister | 24/31 H |
| 3,653,097 | 4/1972 | Kerber | 139/383 AA |
| 4,141,388 | 2/1979 | Romanski et al. | 139/383 AA |
| 4,364,421 | 12/1982 | Martin | 24/33 C |
| 4,392,902 | 7/1983 | Lefferts | 156/161 |
| 4,476,902 | 10/1984 | Westhead | 24/33 C |

FOREIGN PATENT DOCUMENTS

| | | | |
|---|---|---|---|
| 1251105 | 9/1967 | Fed. Rep. of Germany | 139/383 AA |
| 309809 | 7/1933 | Italy | 24/33 C |
| 1348098 | 3/1974 | United Kingdom | 139/383 AA |

Primary Examiner—Victor N. Sakran
Attorney, Agent, or Firm—Kane, Dalsimer, Kane, Sullivan and Kurucz

[57] ABSTRACT

The use of a spiral seam construction to join together the ends of a flat woven papermaker's felt having flat monofilament lengthwise yarns of a synthetic, polymeric resin improves the resistance of the seam to flex fatigue.

8 Claims, 18 Drawing Figures

FIG.11
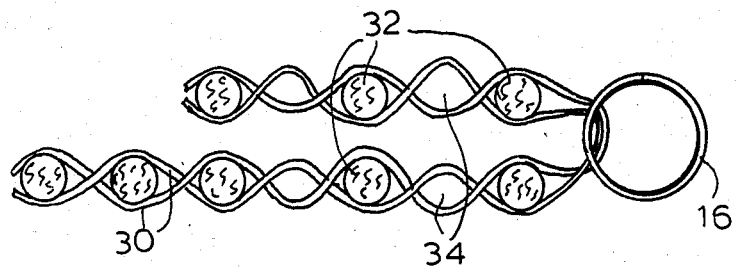
FIG.12
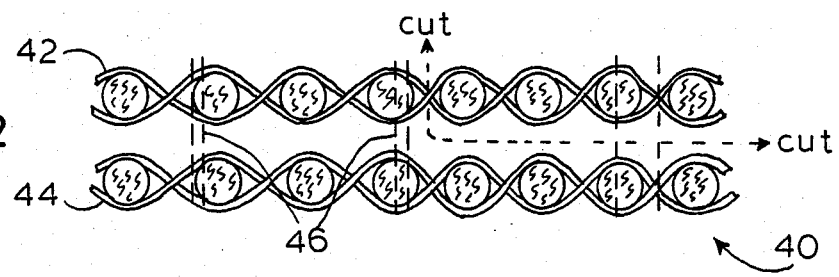
FIG.13
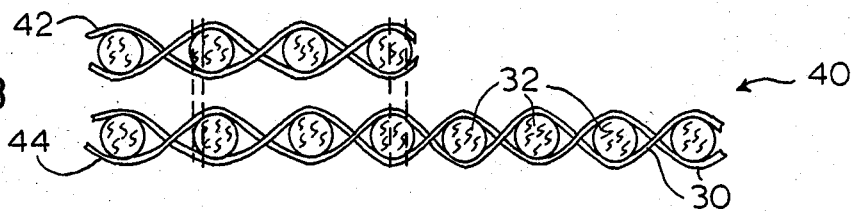
FIG.14
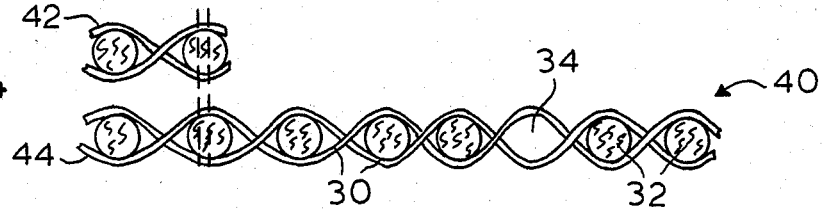
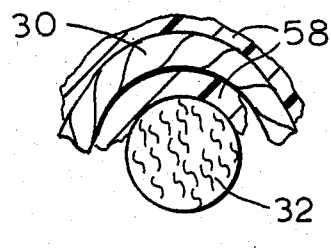
FIG.18

SEAM CONSTRUCTION FOR PAPERMACHINE CLOTHING

BACKGROUND OF THE INVENTION

1. Field of the Invention

The invention relates to a seam construction for joining the ends of a belt, thereby making it endless, and more particularly relates to a spiral seam construction for making endless a flat woven papermakers machine clothing fabricated to include flat monofilament lengthwise (warp) yarns.

2. Brief Description of the Prior Art

The art is replete with descriptions of pin seam constructions for paper makers felts; see for example the disclosures of U.S. Pat. Nos. 2,883,734; 3,436,041; 3,653,097; 4,026,331; 4,006,760; and 4,123,022. The seam construction loops formed along the length of the fabric's lengthwise yarns and extending outwardly from each end of the fabric and anchored in the fabric. The opposing loops are brought together, interleaved and secured together by a cable or pintle passed through the interleafed loops.

A modification of the pin seam is commonly referred to as a "spiral seam". The spiral seam employs, a seaming coil of a single formed monofilament to provide the loops on each side of the seam; see for example U.S. Pat. No. 4,315,049.

In spite of the highly developed state of the seaming art, many problems exist in the practical, day-to-day operation of seamed belts.

One particular problem of prior art seam constructions concerns fabrics possessing flat warp (lengthwise) yarns of polymeric resin monofilaments. These latter belts when made endless with a conventional pin seam are inherently susceptible to flex fatigue and subsequently, a shortened life. We have discovered that this particular problem of the prior art may be alleviated to a degree by the selection and use of a spiral seam.

SUMMARY OF THE INVENTION

The invention comprises a spiral seam construction joining together the two ends of a woven papermakers felt having lengthwise yarns which are flat monofilament yarns of a synthetic, polymeric resin.

It will be appreciated that there are a wide variety of forms of endless woven belts employed in the papermaking industry and referred to as papermakers felts. The term "papermakers felts" includes the form commonly referred to as a "screen" fabricated by weaving synthetic monofilaments or twisted multi-filaments together in an open weave. Although not subjected to any form of milling, and therefore not "felts" in the original sense of the term, these screen fabrics have also become known as "dryer felts", "press felts" and "forming fabrics".

The term "lengthwise yarn" as used herein refers to those yarns interwoven with crosswise yarns to make up a papermaker's felt fabric. These lengthwise yarns are also referred to at times as "warp yarns" or as "machine-direction yarns".

The spiral seam construction is advantageously employed to make endless, flat woven, single and multi-layer papermakers felts. It is particularly advantageous for joining multi-layer screen fabrics such as in employed as a dryer felt in the dryer section of the papermaking machine or as the inner belt in the press section or as a press felt or forming fabric; when the fabric is fabricated from flat lengthwise monofilament yarns of synthetic, polymeric resin materials.

BRIEF DESCRIPTION OF THE DRAWINGS

FIG. 11 is a view as in FIG. 10 but after folding the fabric end to form the spiral seam configuration.

FIG. 12 is a cross-sectional, side elevation of a portion of the end of a multi-layer papermakers felt fabric.

FIG. 13 is a view as in FIG. 12, but after removal of a portion of the upper layer of the felt fabric.

FIG. 14 is a view as in FIG. 13, but after removal of a cross-wise yarn from the felt fabric.

FIG. 18 is an enlarged view of a yarn cross-over site, showing the interlocking of a lengthwise yarn with a crosswise yarn in the fabric shown in FIGS. 12-17, coated with a film of a synthetic, polymeric resin.

DETAILED DESCRIPTION OF THE PREFERRED EMBODIMENTS OF THE INVENTION

Those skilled in the art will readily appreciate the invention from the following discussion of the preferred embodiments when read in conjunction with the accompanying drawings of FIGS. 1-18, inclusive.

Figure 1:
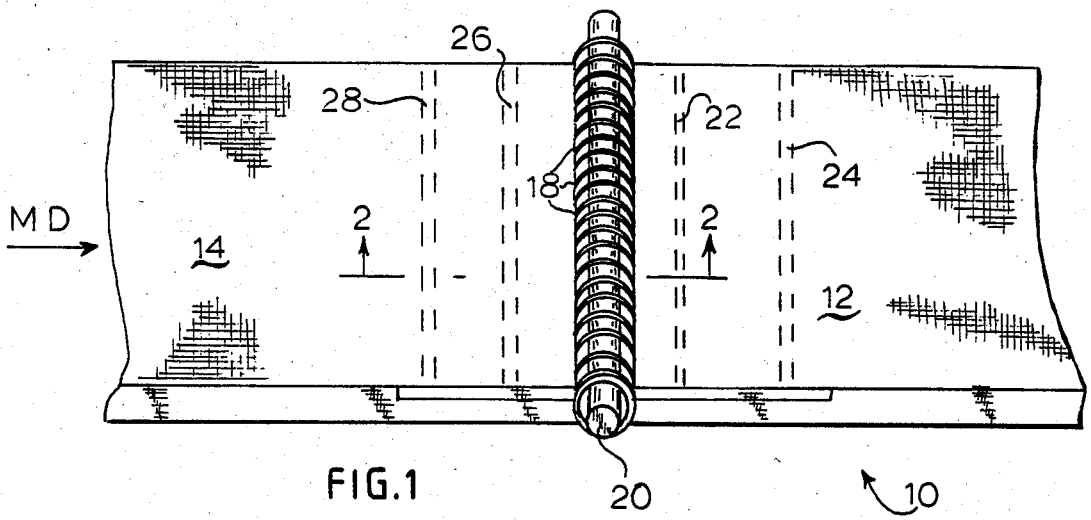
FIG. 1 is a view-in-perspective of the two ends of a flat woven papermakers felt, joined together by a spiral seam construction.

Referring first to FIG. 1, a view-in perspective is seen of the end portions 12, 14 of a length of flat woven dryer felt 10, positioned and joined end to end. The felt 10 is a woven single-layer fabric. The ends 12, 14 are joined together by a pair of seaming coils 16, one being anchored in end 12 and the other in end 14. The coils 16 are interleaved through the spiral helices 18 to form a single pin receiving channel through which a pintle 20 is passed to engage and hold the seaming coils 16 together, thus securing the ends 12, 14 together. The pintle 20 may be a monofilament cable of a synthetic polymeric resin, removably inserted within the pin receiving channel so that the seam may be opened and closed at will. Four stitch lines 22, 24, 26 and 28 assist in securing the seam construction together as will be described more fully hereinafter.

Figure 2:
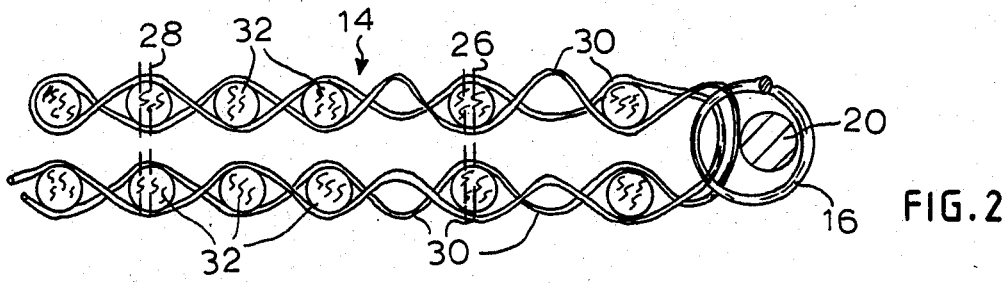
FIG. 2 is a view along lines 2—2 of FIG. 1.

FIG. 2 is an enlarged, cross-sectional side elevational view along lines 2—2 of FIG. 1. As shown in FIG. 2, end 14 of the fabric of felt 10 is made up of a plurality of interwoven lengthwise (warp) yarns 30 and crosswise (weft) yarns 32.

The base of interwoven yarns provides a high degree of stability and structural integrity to the fabric 10. Any commercially available monofilament, multifilament or spun yarns, preferably round monofilament yarns having a diameter within the range of from about 0.002 to 0.040 inches may be advantageously employed as the crosswise yarns 32. Representative of such yarns 32 are multifilaments, monofilaments or spun yards of polyamide, polyester, polypropylene, polyimide and like yarns.

Figure 3:
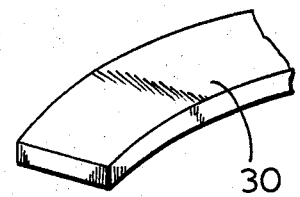
FIG. 3 is an enlarged view of a portion of warp (lengthwise yarn) used in the construction of the felt shown in FIGS. 1 and 2.

The lengthwise yarns 30 are flat monofilaments of a synthetic polymeric resin such as a polyamide, polyolefin or preferably a polyester material. Advantageously the flat monofilament yarns 30 will have a dimension within the range of from about 0.006"×0.010" to 0.050"×0.100". FIG. 3 is an enlarged view of a portion of the lengthwise yarn 30 as used in the fabric shown in belt 10 of FIGS. 1 and 2.

Figure 4:
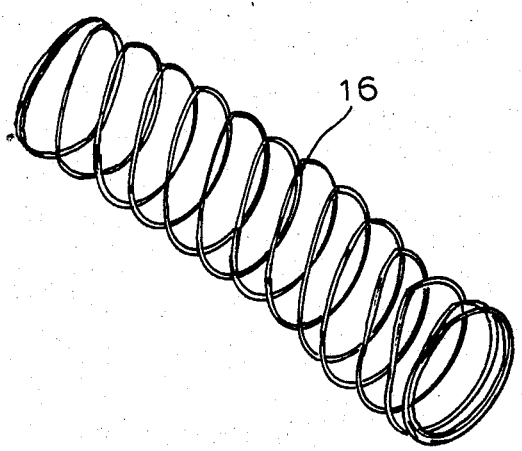
FIG. 4 is a view of a portion of the seaming coil component of the seam shown in FIG. 1.

FIG. 4 is an enlarged view of a portion of the seaming coil 16 shown in FIGS. 1 and 2. The seaming coil 16 is a compound spiral structure made of a continuous length of monofilament of a synthetic polymeric resin, which may be the same or different from the monofilaments of yarns 30, 32. Advantageously, the monofilaments employed to fabricate the coil 16 and pins 20 are monofilaments of polyolefins, polyamides, and like thermoplastic, synthetic, polymeric resins; preferably polyester.

The helices 18 of the seaming coils 16 may be right or left hand spiralling. Although not necessary, the seaming coil 16 of the end 14 will have a left or a right hand spiralling while the seaming coil 16 of the opposing end 12 will have an opposite hand in spiralling to facilitate interleafing of the helices 18 of each seaming coil 16, to create a single pin receiving channel through the central axis of the interleafed seaming coils 16. Advantageously, the seaming coils 16 are fabricated from monofilaments having a diameter of from 0.008" to 0.090". The coil 16 helices 18 are advantageously formed to have a pitch of helices of at least twice the monofilament thickness. The number of helices 18 is preferably within the range of from 5 to 25 turns/inch of run. The diameter of the helice may be selected as appropriate to the thickness of the belt 10 so that it does not significantly exceed the belt 10 thickness, thereby creating a seam which protrudes above the height of the belt itself. The method of making the seaming coils 16 is well known; see for example the description given in U.S. Pat. No. 4,392,902.

Referring again to FIG. 2, it may be seen that the coil 16 is held or mounted within an end 12 or 14 by enfolded within a fold of the end of the fabric of the belt 10, the fold being secured by the stitching 26, 28 (22, 24 in end 12). The method of making the fold and mounting the seaming coils therein will be described below in conjunction with a viewing of the FIGS. 5-11.

Figure 5:
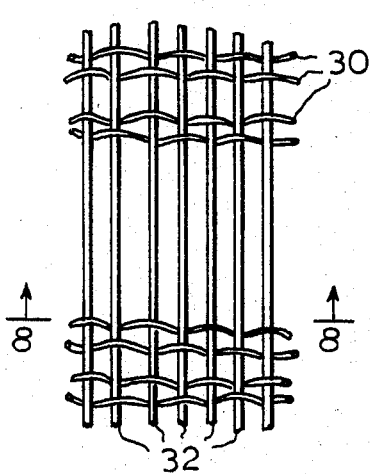
FIGS. 5-7 are schematic representations of the seam fold zone of the seam of FIG. 1, showing steps in fabrication.
Figure 6:
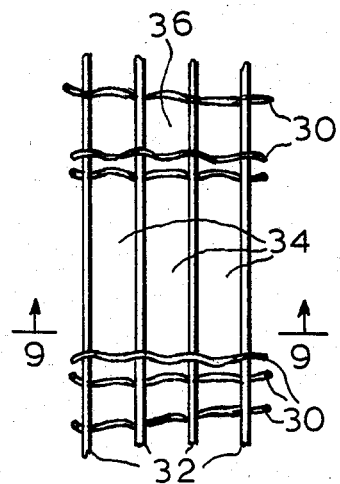
Figure 7:
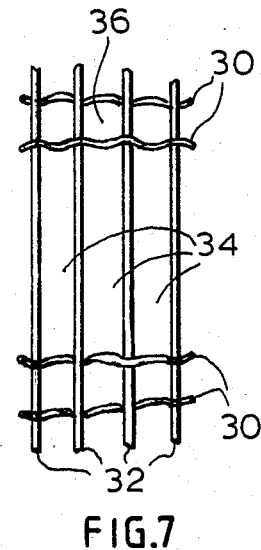
Figure 8:
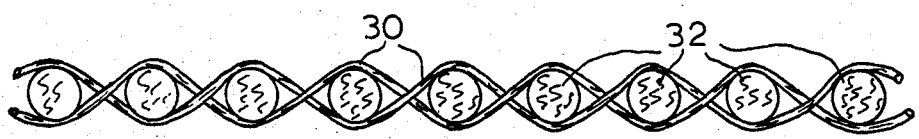
FIG. 8 is a view along lines 8—8 of FIG. 5.

FIGS. 5-7 are schematic representations of the seam fold zone of the seam of FIG. 1, showing steps in fabrication. FIG. 5 is a schematic view showing the crosswise yarns 32 interwoven with lengthwise yarns 30 as described above. For clarity, the crosswise yarns 32 have been omitted from the central portion of the belt 10. In the making of the seam construction, selected crosswise yarns 32 (cross-machine direction yarns) are removed. The yarns 32 removed may be non-adjacent yarns (as shown in FIG. 6) or adjacent yarns 32 (as shown in FIG. 7). The removal of select yarns 32 is in a quantity sufficient to form openings 34 in the fabric ends, between the outer border or terminal end of the belt 10 and an arbitrary inner border defining the "end zone" of the belt 10 end. The ravel or opening 34 has a central axis which is parallel to the axis of the crosswise yarns. Details of the window 34 structure may be seen by referring to the FIGS. 8 and 9 which are views along lines 8—8 of FIG. 5 and 9—9 of FIG. 6, respectively.

Essential to the method of the invention is removal of preselected lengthwise yarns 30 (machine-direction yarns) in the end zone where the seaming coil 16 will be mounted. These portions of the lengthwise yarns are removed in the lateral side margins of the belt 10 end zones so as to reduce their number per inch of fabric, in comparison to the remainder of the belt 10 fabric. The lateral side margin is generally defined in part as being the 3 to 6 inch peripheral edge margin of the belt 10, running in the machine-direction of the belt 10. A reduction of the density of lengthwise yarns 30 in the lateral side margins where the seaming coil 16 will be mounted is necessary to allow the remaining yarns 30 to hold the coil 16 and to orient themselves parallel to the machine direction of the running belt 10. If there is no reduction of the yarn 30 density as illustrated in the FIGS. 6 and 7, the yarns 30 holding the seaming coil 16 will orient themselves at an angle of less than 180° to the machine-direction of the belt 10, apparently from contact pressure of adjacent yarns 30. This adverse orientation of yarns 30 accelerates seam failure.

Removal of lengthwise yarns 30 outside of the lateral margins of the ends 12, 14 of belt 10 are not necessary or desired.

Figure 9:
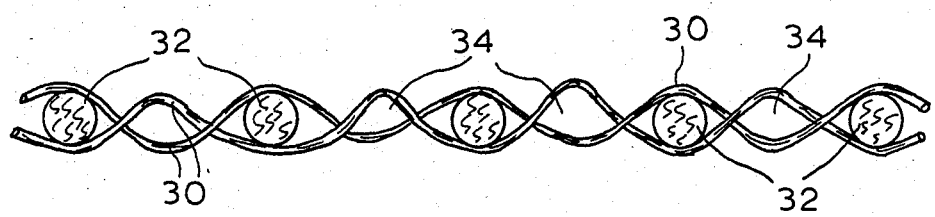
FIG. 9 is a view along lines 9—9 of FIG. 6.
Figure 10:
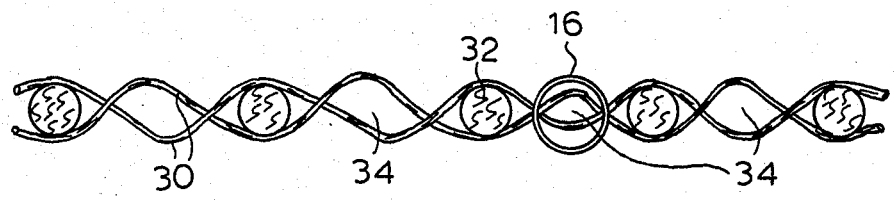
FIG. 10 is a view as in FIG. 9 following insertion of the seaming coil component of FIG. 4.

The coil 16 may be inserted in the window 34 or ravel created by removal of one or more of the crosswise yarns 32 as shown in FIG. 10, a view as shown in FIG. 9 with a laid-in seaming coil 16. The coil 16 is secured in its mounting by folding the end of the fabric around the ravel or window 34 axis enclosing coil 16 as shown in FIG. 11, a view as in FIG. 10 but following folding of the fabric end of belt 10. The fold is secured by stitching as described above and shown in FIG. 2. Sewing the area inward of the coil 16 (stitching 22, 24, 26, 28) binds the fold together to reduce or eliminate the tendency of one part of the fold to act independently of the other part, thereby encouraging seam failure.

It should be noted that when the embodiment fabric of belt 10 is folded as described above it does not significantly increase the thickness of the seam, beyond the thickness of the belt 10 itself. This is because the diameter of the seaming coil 16 is selected to be equal to or less than the thickness of the belt 10 and removal of crosswise yarns 32 reduces fabric thickness in the area of the fold. As much as 40 percent of the fabric thickness may be removed by removal of selected crosswise yarns 32. Thus seam thickness may be controlled in a single layer papermaker's felt by the selected removal of crosswise yarns in the fold area as well as in the creation of the ravel or window for mounting of the seaming coil 16. The control of seam thickness may be accomplished in multi-layer papermaker's felts in another way.

FIG. 12 is a cross-sectional side elevation of a portion of the end 40 of a multi-layer papermaker's felt fabric. As shown in FIG. 12, the base layer 44 of the fabric end 40 consists of a duplex type weave of lengthwise (warp) flat monofilament yarns 30 as described above, interwoven with crosswise (weft) yarns 32, also as described above.

As also shown in FIG. 12, the upper surface or layer 42 of the fabric of end 40 consists of a single layer of interwoven yarns formed by the weaving of lengthwise or warp flat yarns 30 and crosswise of filler yarns 32.

The lengthwise yarns 30 may also function to integrate the layers 42, 44. Lengthwise yarns 30 in layer 42 may occasionally dip to interweave with a crosswise yarn 32 in the fabric base layer 44. The fabric may be woven on a conventional papermakers felt loom in a single operation. In such an operation, the base 44 yarns 30, 32 are woven while the upper 42 yarns 30, 32 are woven directly above the base 44 yarns 30, 32. The combining together of the two yarn systems in separate layers 42, 44 is performed during the weaving operation by sinking one of the upper 42 yarns 30 to interlace with one of the base 44 yarns 32. The combining of the two systems is preferably in a set sequence, for example, on every other base 44 cross-wise yarns 32 so as not to distort either the upper layer 42 yarns or the lower yarn base 44. As shown in FIG. 12, the two layers 42, 44 are more simply combined by the use of binder threads 46.

Figure 15:
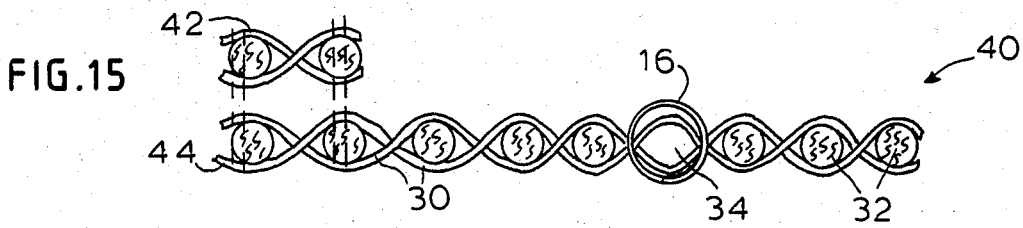
FIG. 15 is a view as in FIG. 14 but after insertion of a seaming coil component of FIG. 4.
Figure 16:
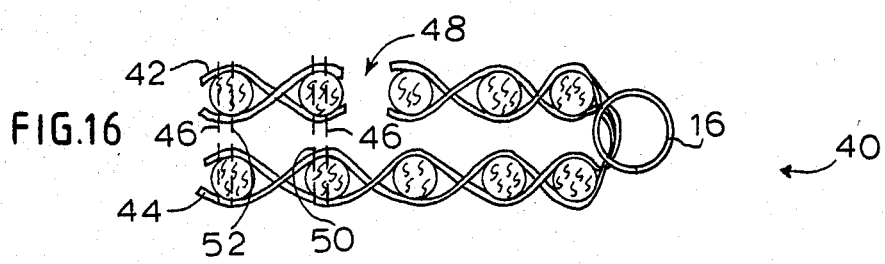
FIG. 16 is a view as in FIG. 15, but after folding of the fabric end to form a spiral seam.
Figure 17:
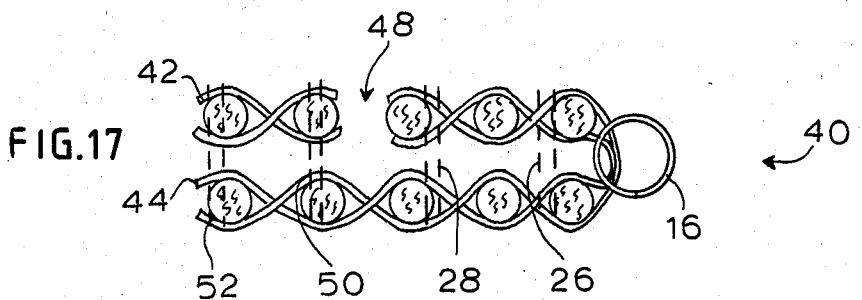
FIG. 17 is a view as in FIG. 16, but after stitching of the seam construction.

In the initial step for preparing the multi-layered belt end 40 for seaming to a like, opposite end, the upper layer 42 is cut away to create a seam zone defined by inner and outer borders and lateral side margins as previously described; see FIG. 13 a view as in FIG. 12 but with a portion of upper layer 42 cut away. The sequence of seam preparation following the cut-away is then identical to that described above for a single layer belt 10. Thus as shown in FIG. 14, select crosswise yarns 32 are removed to form a window 34 (ravel). FIG. 15 is a view as in FIG. 14 and shows as in FIG. 10 the laying in of a seaming coil 16. The coil 16 is secured therein by folding of the fabric as shown in FIG. 16, leaving a gap 48. The fold is secured by stitching, with stitches 26, 28 as shown in FIG. 17. In addition, the end 40 of the belt may be further stabilized by stitching 50, 52 behind the fold as shown in FIG. 17 a view of the multi-layered seam construction.

Regardless of the nature of the fabric of the papermaker's felt, i.e.; single or multi-layered, the coil seam is advantageously stabilized and made to flex uniformly by coating the seam construction with a curable, synthetic, polymeric resin. Upon curing, the cured resin functions to bind yarn relationships together, providing the desired uniformity of flexing. Representative of synthetic polymeric resins which may be employed are polyepoxides, polyamides and the like. FIG. 18 is an enlarged view of a crossover site, between yarns 30, 32 as described above. The FIG. 18 shows fixation of the crossover by cured resin 58.

The following example describes the manner and process of making and using the invention and sets forth the best mode contemplated by the inventors of carrying out the invention but is not to be construed as limiting.

EXAMPLE 1

There is provided a quantity of 0.020 inch diameter polyester monofilament and a quantity of 0.021 inch diameter polyamide (nylon) monofilament yarn.

The monofilament yarns are woven together in a duplex pattern, i.e., a double system of filling with a system of warp yarns to form a base. The base is composed of two "ends" of the polyester monofilament and two ends of nylon monofilament alternating across the width of the fabric. Each end (warp) runs the length of the fabric. The density of the monofilament warp yarns in the product is 48 ends to the inch. The total end density is then 72 yarns to the inch. The number of fillings in the product is 37½ fillings per inch. The ends of the product are freed to break the ends. The upper layer is cut away a distance of several inches to provide seam halves in each end of the fabric structure. The ends are then partially unraveled by removal of selected crosswise yarns in a sequence of 1,3,5 etc. Lengthwise yarns in the lateral margins (3" of the edges) in the ravel are broken out. A compound spiral monofilament of polyester is laid in the ravel area.

The diameter of the coil filament was 0.70 mm. (0.028 inch), the number of coils/inch was 12 and the helical pitch was 75°. The coil is secured in the ravel area by folding the base layer over to leave the helices of the coil protruding at the end of each belt end. The fold is secured by stitching and coating with a film of polyepoxide resin. The two ends are brought together to interleaf the helices of the two seaming coils and joinder is made with a pin through the monofilament coil loops. When installed on a paper machine as a dryer felt the fabric performs well in the manufacture of papers. The belt tracks well, is easily guided and exhibits an exceptionally long life.

Those skilled in the art will appreciate that many modifications to the above-described preferred embodiment may be made without departing from the spirit and the scope of the invention. For example, press fabrics or forming fabrics may be joined together in the manner described above.

Also, although the preferred embodiments described herein refer to single and duplex weaves, the seam construction may be advantageously employed in papermakers' felts having more than two layers.

What is claimed:

1. A spiral seam construction joining the two ends of a flat, woven papermaker's felt having a fabric body comprising interwoven lengthwise and crosswise yarns, said lengthwise yarns being flat monofilaments of a synthetic, polymeric resin, which comprises;
   (A) a first end of the body, having a first outer border at the terminus of the first end and on a plane parallel to the crosswise yarns, and a first inner border spaced inwardly of the first outer border on a plane parallel to the plane of the first outer border;
   (B) a second end of the body, having a second outer border at the terminus of the second end and on a plane parallel to the crosswise yarns, and a second inner border spaced inwardly of the second outer border on a plane parallel to the plane of the second outer border;
   each of said first and second ends also having first and second lateral side margins extending along the side edges of the body from the terminus to the respective inner borders on a plane parallel to the lengthwise yarns;
   the first lateral side margin of the first end being spaced apart from the second lateral side margin of the first end and the first lateral side margin of the second end being spaced apart from the second lateral side margin of the second end;
   each of said first and second ends also having an opening therein located between inner and outer borders and extending from first to second lateral side margins, said opening having a central axis parallel to the crosswise yarns;
   the number of lengthwise yarns per inch of fabric body in the lateral side margins being a lesser number than the number of lengthwise yarns per inch in the fabric body between first and second lateral side margins;

each of said first and second ends being folded upon themselves around the central axis of the opening placing the inner border of each end in abutting contact with the outer border of each end;

(C) means for securing the fold;

(D) a first spiral coil of a polymeric resin monofilament mounted in the window of the first end and secured therein by the fold of the first end;

(E) a second spiral coil of a polymeric resin monofilament mounted in the window of the second end and secured therein by the fold of the second end; the helices of the first and second spiral coils being interleafed with each other to form a pin receiving channel;

(F) a pin inserted in the pin receiving channel whereby the first end is removably joined to the second end; and (G) resin coating means for stabilizing the seam construction, on the yarns of the first and second ends.

2. The seam construction of claim 1 wherein the means for securing the fold comprises stitching.

3. The seam construction of claim 1 wherein the pin is a monofilament cable.

4. The seam construction of claim 1 wherein the fabric body is a single-layer weave.

5. The seam construction of claim 1 wherein the fabric body is a multi-layer weave and a layer of the weave in the seam area is removed.

6. The seam construction of claim 1 wherein the felt is a wet press felt.

7. The seam construction of claim 1 wherein the felt is a dryer felt.

8. The seam construction of claim 1 wherein the felt is a forming fabric.

* * * * *